Figure 1:
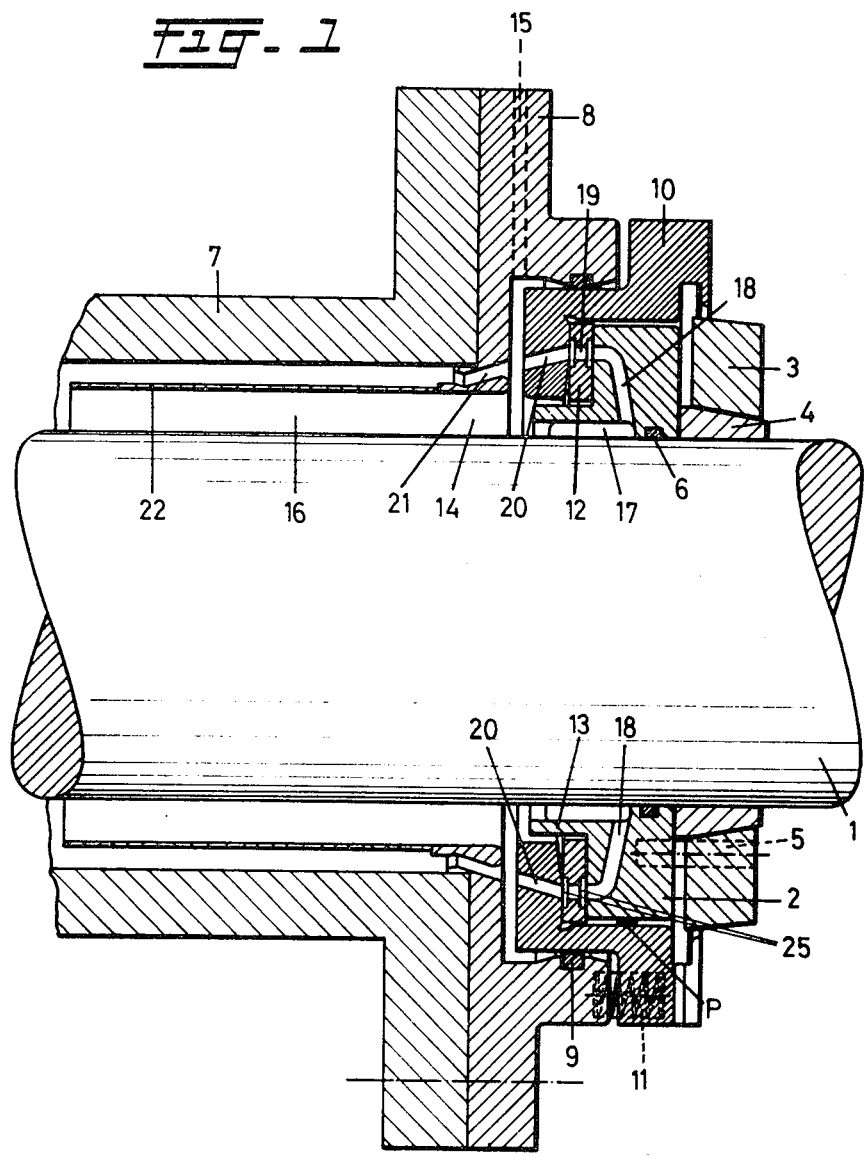

United States Patent

[11] 3,632,120

| [72] | Inventor | Willem Matthijs Brandt<br>Bilderdijkstraat 12,, Leiden, Netherlands |
|------|----------|------|
| [21] | Appl. No. | 885,866 |
| [22] | Filed | Dec. 17, 1969 |
| [45] | Patented | Jan. 4, 1972 |
| [32] | Priority | Dec. 17, 1968 |
| [33] | | Netherlands |
| [31] | | 6818088 |

[54] STERN SHAFT SEAL
1 Claim, 2 Drawing Figs.

[52] U.S. Cl. .................................................. 277/83,
277/67, 308/36.3
[51] Int. Cl. ...................................................... F16j 15/34,
F16c 33/72
[50] Field of Search ............................................ 277/83;
115/0.5, 34; 308/36.3

[56] References Cited
UNITED STATES PATENTS

| 2,306,664 | 12/1942 | Scott-Paine ................. | 115/34 |
| 2,727,765 | 12/1955 | Kilpatrick ..................... | 277/83 |
| 2,743,948 | 5/1956 | Heinrich ....................... | 277/83 |
| 3,177,841 | 4/1965 | Galuska ........................ | 115/34 |

*Primary Examiner*—Martin P. Schwadron
*Assistant Examiner*—Barry Grossman
*Attorney*—Waters, Roditi, Schwartz & Nissen

ABSTRACT: A stern shaft seal is provided with one or more intermediate rings between a flange on the shaft and another flange on the stern tube. The intermediate ring is freely rotatable between the flanges and reduces friction and heating of lubricant. Means are proposed for improving lubrication.

STERN SHAFT SEAL

This invention relates to a stern shaft seal comprising a first radial flange connected with the stern shaft in sealing relationship and restrained from relative rotation, a second radial flange connected with the stern tube in sealing relationship and restrained from relative rotation, and sealing means interposed between said flanges. In known constructions said sealing means is a layer of liquid, for example, oil, which also reduces friction between the rotary parts and makes it possible for the generated frictional heat to be dissipated along with the oil.

These known sealing constructions have various drawbacks. One drawback is that oil which is continuously discharged via the sealing surfaces to outside the ship represents a considerable cost item in the way of oil loss. Another difficulty is that heat generation, especially at high speeds, leads to a decreased viscosity of the oil, often resulting in metal-to-metal contact and the flanges seizing to each other and becoming grooved, so that frequent repairs are necessary.

It is an object of the present invention to provide a stern shaft seal which ameliorates the above drawbacks to a considerable extent.

According to the invention, there is provided a stern shaft seal comprising a first radial flange connected with the stern shaft in sealing relationship and restrained from relative rotation, a second radial flange connected with the stern tube in sealing relationship and restrained from relative rotation, and sealing means provided between said flanges, said sealing means comprising at least one intermediate ring freely rotatable between said first flange and said second flange.

Such a freely rotatable intermediate ring, which assumes about half the rotary speed of the propeller shaft, decreased the overall frictional energy to such an extent as to considerably reduce the risk of unduly low lubricant viscosity due to overheating.

In a preferred embodiment of the invention, the intermediate ring is mounted for ample radial movement. With this arrangement, the intermediate ring will perform an eccentric movement when the stern shaft rotates, which results in an oscillating movement relative to the flanges of the stern shaft and the stern tube. It has turned out that this prevents the formation of grooves, so that repairs are seldom necessary, and the maintenance-free period of a seal according to the invention is considerably longer than that of prior seals.

Preferably, the member carrying the second fixed flange is mounted so as to be flexible relative to the stern tube, to ensure adaptation to the periodically changing angular position of the stern shaft flange during oscillations of the shaft.

The oil circuit in the construction according to the invention can be so arranged that a good supply of oil on both sides of the intermediate ring is ensured. To this effect, according to the invention, the intermediate ring is provided with axial holes which establish flow communication between the two friction surfaces. According to another feature of the invention, the first and the second flange are likewise provided with axial bores, whose radial position is such as to enable them to achieve flow communication between them. To ensure uninterrupted passage between the first and the second flange and the intermediate ring, the latter is on one or both sides provided with a concentric groove which interconnects the axial holes.

Some embodiments of the invention will be described, by way of example, with reference to the accompanying drawings, in which FIG. 1 is an axial section of a seal according to the invention, sealing between the stern tube and ship's interior.

Figure 2:
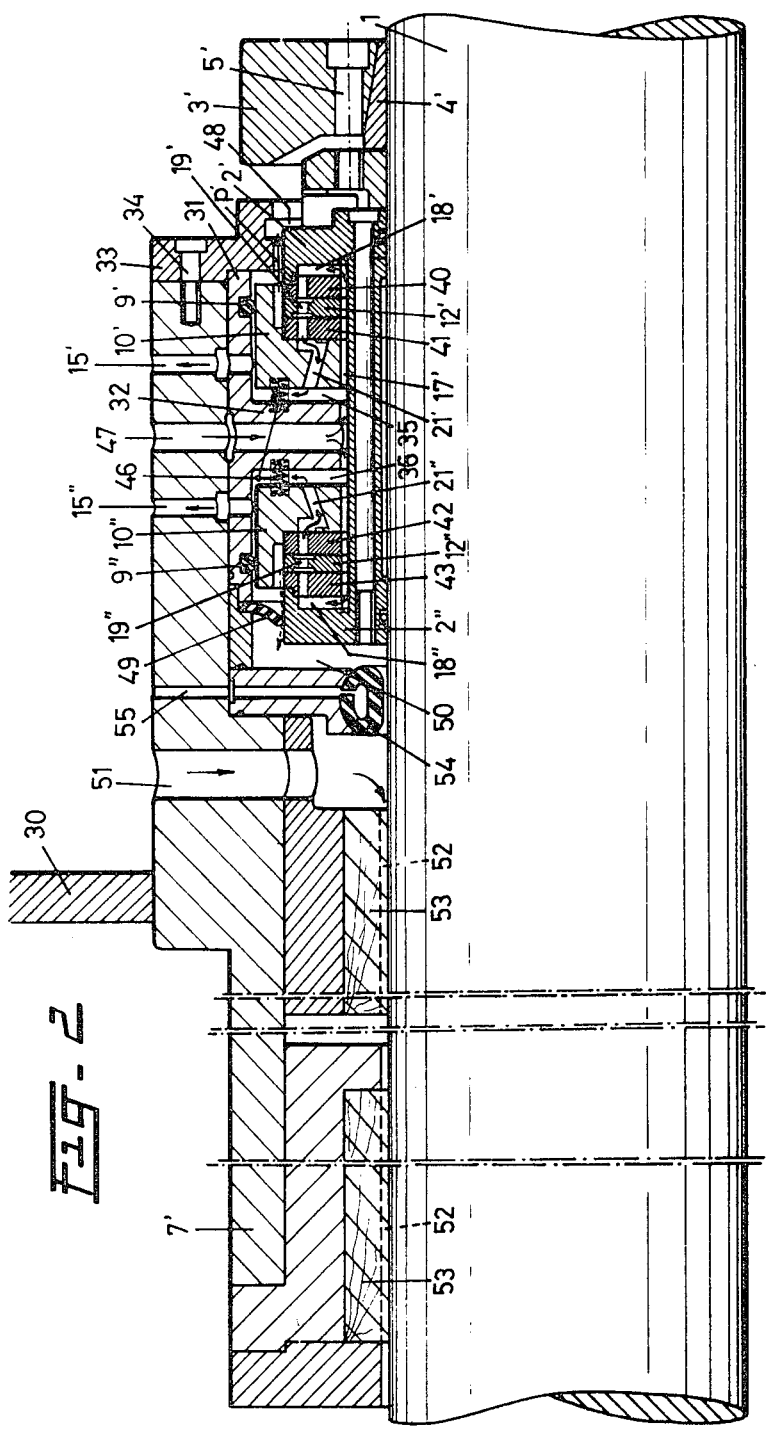

FIG. 2 is an axial section of a so-called double construction of the seal according to the invention, sealing from the interior of the ship and the ambient water.

Referring to FIG. 1, there is shown a ship's propeller shaft 1 provided with a steel flange 2 which by known means 3,4,5 is secured to the shaft so as to be restrained from relative rotation. A gasket 6 provides for sealing with the shaft. A stern tube 7, fixedly connected with the ship, carries a flange 8, to which a flange 8 is secured in a sealing and flexible fashion by means of a gasket 9. The flange 10 is biased outwardly by a plurality of springs 11 disposed along the circumference of a circle. Disposed between the flanges 2 and 10 is an intermediate ring 12 mounted for free rotation, possibly with ample radial play relative to a tubular extension 13 of flange 2. The intermediate ring 12 may, for example, be made of bronze. An oil circuit 14, which is fed through a duct 15 formed in the flange 8 from an elevated reservoir (not shown), is constituted by an annular compartment 16, an annular compartment 17, the radial ducts 18 formed in the flange 2, which connect with bores 19 in intermediate ring 12, bores 20 in flange 10 and bores 21 in flange 8, whence the circuit continues in the stern tube 7 to return in the annular compartment 16.

In the stern tube, there is preferably provided a sleeve 22, which prolongs the residence time of the circulating oil in the tube, which promotes cooling of the oil.

The operation of the seal according to the invention is as follows.

The flange 2 rotating along with the shaft 1 drags along the intermediate ring 12 at about half its own angular velocity. Provided between the contacting surfaces of the flange 2, the ring 12 and the flange 10 is a layer of oil maintained by the relative movement of the contacting surfaces, and whose supply is promoted by the pump action of the radial ducts 18. At the outer circumference of the contacting surfaces, a little oil continuously issues outwardly (arrow P) against the pressure prevailing outside. When the propeller shaft rotates eccentrically and/or performs a swaying movement, the flexible mounting of the flange 10 will ensure the contact between the flanges 2 and 10 with the intermediate ring 12. By virtue of this, oil consumption will be low even if the shaft oscillates.

The intermediate ring 12 is retained by the tubular extension 13 of the flange 2 and the flange 10 in such a manner that the ring is capable of moving freely in a radial plane over a relatively large distance. It has been found that the intermediate ring consequently performs an eccentric rotation relative to the flanges 2 and 10, which prevents the formation of grooves and ridges on the contacting surfaces.

The intermediate ring 12 may be provided on one or both sides with a concentric open duct 25, which interconnects the bores 19.

FIG. 2 shows a so-called double construction of the seal according to the invention, and at the same time shows a different construction of the seal proper. Parts having essentially the same function as parts in the singular construction of FIG. 1 are provided with the same reference numerals in the double construction of FIG. 2, but the latter have one or more apostrophes.

The stern tube 7' is secured in the bulkhead 30. The stern tube 7' has a removable liner 31 which approximately in the middle has an internal radial flange 32, the lines 31 being retained by the flange 33, which in turn is bolted to the stern tube 7' by means of bolts 34.

The two flanges are secured to the stern shaft by known means 3',4',5' so as to be restrained from rotation. The flanges 10' and 10" are mounted in the liner 31 in sealing and flexible fashion by means of gasket 9'. At their wearing surfaces, the flanges 2' and 2" and 10' and 10" are provided with a liner in the form of accurately machined rings 40,41,42, and 43, for example, of stainless steel. Intermediate rings 12' and 12" are disposed between the rings 40,41 and 42,43, respectively. A plurality of compression springs 46, disposed along the circumference of a circle, urge the rings 40,12',41 and rings 42,12",43 against each other.

The oil circuit (see the arrows) is constituted by inlet duct 47, connected with an elevated oil reservoir (not shown), annular compartment 17', ducts 18' and 18", bores 19' and 19", ducts 21' and 21" in flanges 10' and 10", respectively, annular compartments 35 and 36, and ducts 15' and 15", leading back to the reservoir not shown. The oil issuing between the rings 40,41 and intermediate ring 12' (see arrow P') is collected in a groove 48, which has a discharge opening (not shown) at its lower end.

The oil issuing from the seal 42, 12", 43 (see the dotted arrow) continuously forces a skirt 49, acting as a nonreturn valve, to its open position, whereafter the oil enters the compartment 50, filled with ambient water. When the shaft 1 is stationary, the ambient water forces the flap 49 shut against the flange 2", so that under stationary conditions there is no exchange of oil and ambient water.

The great flexibility of the seal according to the invention creates a special possibility concerning the mounting of the propeller shaft. The well-known mounting in lignum vitae, i.e., in lignum vitae bearings provided with longitudinal grooves and permitting water lubrication, has many advantages, and has therefore found wide application in the past. However, by reason of the fact that the clearance with the propeller shaft is rather considerable, resulting in leaky seals, and at any rate excessive oil consumption, the use of the lignum vitae bearing has gradually been discarded. With a seal of the present invention, however, a lignum vitae bearing can again be used without any objection. By virtue of the combination with the invention, it now becomes possible to scavenge the lignum vitae bearings 53 by means of circulated ambient water through bore 51 (see the arrow). Particularly in shallow rivers, the stern shaft bearings are apt to become fouled with sand. According to the present invention, ambient water, freed from sand and other dirt, is forced into the ducts 51, for example, by means of a sand pump not shown, and then flows outwardly through the longitudinal grooves 52 of the lignum vitae bearings 53.

For purposes of inspection, repairs, or maintenance of the seal according to the invention, the latter can be moved to some free point on the shaft 1 by detaching flange 13, whereafter the liner 31 with the entire seal structure can be bodily moved.

In order that this may also be effected without drydocking the ship, an inflatable bellows 54 is mounted at the end of the liner 31 pointing to the propeller, which bellows can be inflated via a duct 55 and then sealingly clamps around the shaft 1.

The invention is not limited to the embodiments described. Thus, for example, more than one intermediate ring can be mounted between the wearing rings. Also, an oil circuit with the extra pumping pressure from the radial holes in the flange rotating along with the propeller shaft is not necessary, and an oil circuit per se is not necessary either, in an embodiment in which the intermediate ring is made of an oil-impregnated material, such as sintered bronze. The intermediate ring may also be made of a resilient material, for example, rubber.

I claim:

1. A stern shaft seal comprising a radial first flange connected with a stern shaft in sealing relationship and being restrained from rotation relative thereto; a second radial flange connected with a stern tube in sealing relationship and being restrained from rotation relative thereto; sealing means provided between said flanges, said sealing means comprising at least one intermediate ring freely rotatable between said first flange and said second flange, said intermediate ring being freely radially movable, said intermediate ring having axial bores for forming a liquid circulating passage, a duct formed in a side surface of said intermediate ring and circumferentially interconnecting said axial bores, said first flange and said second flange including passages arranged to terminate in correspondence with the axial bores in said ring, said first flange passage including means for a liquid flow circuit adapted to exert a centrifugal pumping action on the liquid upon rotation of the shaft, and said second flange having a flexible connection with said stern tube.

* * * * *